(12) United States Patent
Wood (10) Patent No.: US 9,171,059 B2
(45) Date of Patent: *Oct. 27, 2015

(54) SELECTIVE QUANTITY TAKEOFF FROM COMPUTER AIDED DESIGN DRAWINGS

(75) Inventor: Andrew Wood, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 675 days.

This patent is subject to a terminal disclaimer.

(21) Appl. No.: 12/054,327

(22) Filed: Mar. 24, 2008

(65) Prior Publication Data

US 2009/0240730 A1    Sep. 24, 2009

(51) Int. Cl.
*G06F 17/50*    (2006.01)
*G06F 17/30*    (2006.01)

(52) U.S. Cl.
CPC .................................. *G06F 17/30607* (2013.01)

(58) Field of Classification Search
CPC . G06F 17/50; G06F 17/5004; G06F 17/5018; G06F 17/5095; G06T 19/00
USPC ................................................ 703/1; 705/29
See application file for complete search history.

(56) References Cited

U.S. PATENT DOCUMENTS

| | | | |
|---|---|---|---|
| 5,907,850 A | 5/1999 | Krause et al. | |
| 2001/0037190 A1 * | 11/2001 | Jung | ................................... 703/1 |
| 2004/0205519 A1 | 10/2004 | Chapel et al. | |
| 2005/0203718 A1 | 9/2005 | Carek et al. | |
| 2006/0044307 A1 | 3/2006 | Song | |
| 2008/0004844 A1 | 1/2008 | Kefford et al. | |
| 2008/0015823 A1 | 1/2008 | Arnold et al. | |
| 2008/0269942 A1 | 10/2008 | Free | |
| 2009/0070071 A1 | 3/2009 | Wood | |
| 2009/0070072 A1 | 3/2009 | Wood | |
| 2009/0070073 A1 | 3/2009 | Wood | |

OTHER PUBLICATIONS

International Search Report. Nov. 7, 2008.
Office Action in U.S. Appl. No. 12/138,318, mailed Nov. 22, 2010.

* cited by examiner

*Primary Examiner* — Saif Alhija
(74) *Attorney, Agent, or Firm* — Artegis Law Group, LLP (57) ABSTRACT

One embodiment of the invention sets forth a CAD application configured to perform quantity takeoff computations. The CAD application is further configured to organize a CAD drawing into a hierarchical representation of object families and associated object types, where instances of the object types represent drawing objects present in the CAD drawing. The CAD application is further configured to receive a selection of an object family and to parse the selection to determine the object types associated with the selection. The CAD application then creates a takeoff object for each of the object types associated with the selection and identifies instances, associated with object properties, of each of the object types of the selection. The CAD application quantifies the instances and associated properties to produce a quantity takeoff value. Advantageously, users are able to more quickly and easily estimate the cost of a design project associated with the CAD drawing.

18 Claims, 6 Drawing Sheets

Takeoff Report
500

| | Description | Quantity... | Material Cost | | Labor Cost | | Equipme... | Total |
|---|---|---|---|---|---|---|---|---|
| | | | Unit Cost | Total | Unit Cost | Total | | |
| 516A | Basic Wall | 18.97 m | $20.00 | $379.40 | $10.00 | $189.70 | $0.00 | $569.10 |
| 514A | Basic Wall | 2.47 m | $20.00 | $49.40 | $10.00 | $24.70 | $0.00 | $74.10 |
| 514B | Basic Wall | 10.00 m | $20.00 | $200.00 | $10.00 | $100.00 | $0.00 | $300.00 |
| 514C | Basic Wall | 5.50 m | $20.00 | $110.00 | $10.00 | $55.00 | $0.00 | $165.00 |
| 514D | Basic Wall | 1.00 m | $20.00 | $20.00 | $10.00 | $10.00 | $0.00 | $30.00 |
| 516B | Door #1 | 1 EA | $34.00 | $34.00 | $14.00 | $14.00 | $0.00 | $48.00 |
| 514E | Door #1 | 1 EA | $34.00 | $34.00 | $14.00 | $14.00 | $0.00 | $48.00 |
| 520 | Project Total | | | $413.40 | | $203.70 | $0.00 | $617.10 |

Description 502 | Quantity 504 | Material Cost 506 | Labor Cost 508 | Equipment Cost 510 | Total Cost 512

| Description | Quantity... | Material Cost | | Labor Cost | | Equipme... | Total |
|---|---|---|---|---|---|---|---|
| | | Unit Cost | Total | Unit Cost | Total | | |
| Basic Wall | 18.97 m | $20.00 | $379.40 | $10.00 | $189.70 | $0.00 | $569.10 |
| Basic Wall | 2.47 m | $20.00 | $49.40 | $10.00 | $24.70 | $0.00 | $74.10 |
| Basic Wall | 10.00 m | $20.00 | $200.00 | $10.00 | $100.00 | $0.00 | $300.00 |
| Basic Wall | 5.50 m | $20.00 | $110.00 | $10.00 | $55.00 | $0.00 | $165.00 |
| Basic Wall | 1.00 m | $20.00 | $20.00 | $10.00 | $10.00 | $0.00 | $30.00 |
| Door #1 | 1 EA | $34.00 | $34.00 | $14.00 | $14.00 | $0.00 | $48.00 |
| Door #1 | 1 EA | $34.00 | $34.00 | $14.00 | $14.00 | $0.00 | $48.00 |
| Project Total | | | $413.40 | | $203.70 | | $617.10 |

SELECTIVE QUANTITY TAKEOFF FROM COMPUTER AIDED DESIGN DRAWINGS

BACKGROUND OF THE INVENTION

1. Field of the Invention

The present invention generally relates to computer software. More specifically, the present invention relates to techniques for selective quantity takeoff from computer aided design drawings.

2. Description of the Related Art

The term computer aided design (CAD) generally refers to a broad variety of computer-based tools used by architects, engineers, and other construction and design professionals. CAD applications may be used to construct computer models representing virtually any real-world construct. Commonly, CAD applications are used to compose computer models and drawings related to design projects. For example, a CAD application may be used to compose a three-dimensional (3D) model of a house or an office building. Once composed, these CAD models are often used to generate a variety of two-dimensional (2D) and 3D views, such as plan, profile, section, and elevation views. Additionally, such models may be used to generate architectural, construction, engineering, and other documentation related to the design project.

A common requirement of design projects is to generate an estimate of the cost of the design project from the design drawings. This estimate can be used as part of the bidding process or as part of the pricing process. The term "quantity takeoff" refers to the process of generating estimates of quantities needed to construct the design project, based on the design drawings and specifications. The quantities may include numerical counts, such as the number of doors and windows in a project, but may also include other quantities such as a volume of material or a linear amount feet of material. Based on the quantity takeoff, generating the cost estimate for a design project typically involves selecting associated materials, determining labor costs, and generating the estimate of the cost of the project.

Typically, the quantity takeoff process is performed manually. For example, a project manager may use a printout, a pen, and a clicker to manually count objects illustrated in a set of construction documents. The project manager may physically mark each instance of an object in the construction documents, using the clicker to maintain an instance count. A digitizer may be used to take measurements of construction elements. However, performing quantity takeoff manually is laborious and error prone. Moreover, if the project design is modified after the original cost estimate is calculated, the takeoff process may need to be repeated. If the takeoff process is not repeated after design changes, accumulated inaccuracies in the cost estimate may adversely affect the bidding or pricing process.

To address these problems, some CAD applications have been configured to perform simplistic quantity takeoff computations from CAD drawings. These systems still have certain drawbacks, however. One specific drawback is that only one "object type" can be taken-off at a time. Object types define an abstract template of which specific instances a particular object are present in the CAD drawing. Taking off each object type separately can be a time consuming and laborious process if many different types of objects exist in the CAD model. These situations frequently arise in more complicated projects, such as those involving the design and construction of large office buildings, shopping malls, bridges, and tunnels, to name a few.

As the foregoing illustrates, what is needed in the art is a more effective and flexible technique for performing quantity takeoff computations in more complicated CAD models.

SUMMARY OF THE INVENTION

Embodiments of the present invention provide a method for performing a quantity takeoff computation. A CAD application is configured to organize a CAD drawing into a hierarchical representation of object families and associated object types, where instances of the object types represent drawing objects present in the CAD drawing. The CAD application is further configured to receive a selection of an object family and to parse the selection to determine the object types associated with the selection. The CAD application then creates a takeoff object for each of the object types associated with the selection and identifies instances, associated with object properties, of each of the object types of the selection. The CAD application quantifies the instances and associated properties to produce a quantity takeoff value. Advantageously, users are able to more quickly and easily estimate the cost of a design project associated with the CAD drawing.

One advantage of the disclosed method is that it provides a user with the ability to perform a quantity takeoff across the different object types in one or more object families simultaneously. A second advantage is that a user may perform a quantity takeoff on an entire CAD drawing by invoking a single command. With such an approach, users are able to more quickly and easily estimate the cost of a design project relative to prior art approaches.

DETAILED DESCRIPTION

Figure 1:
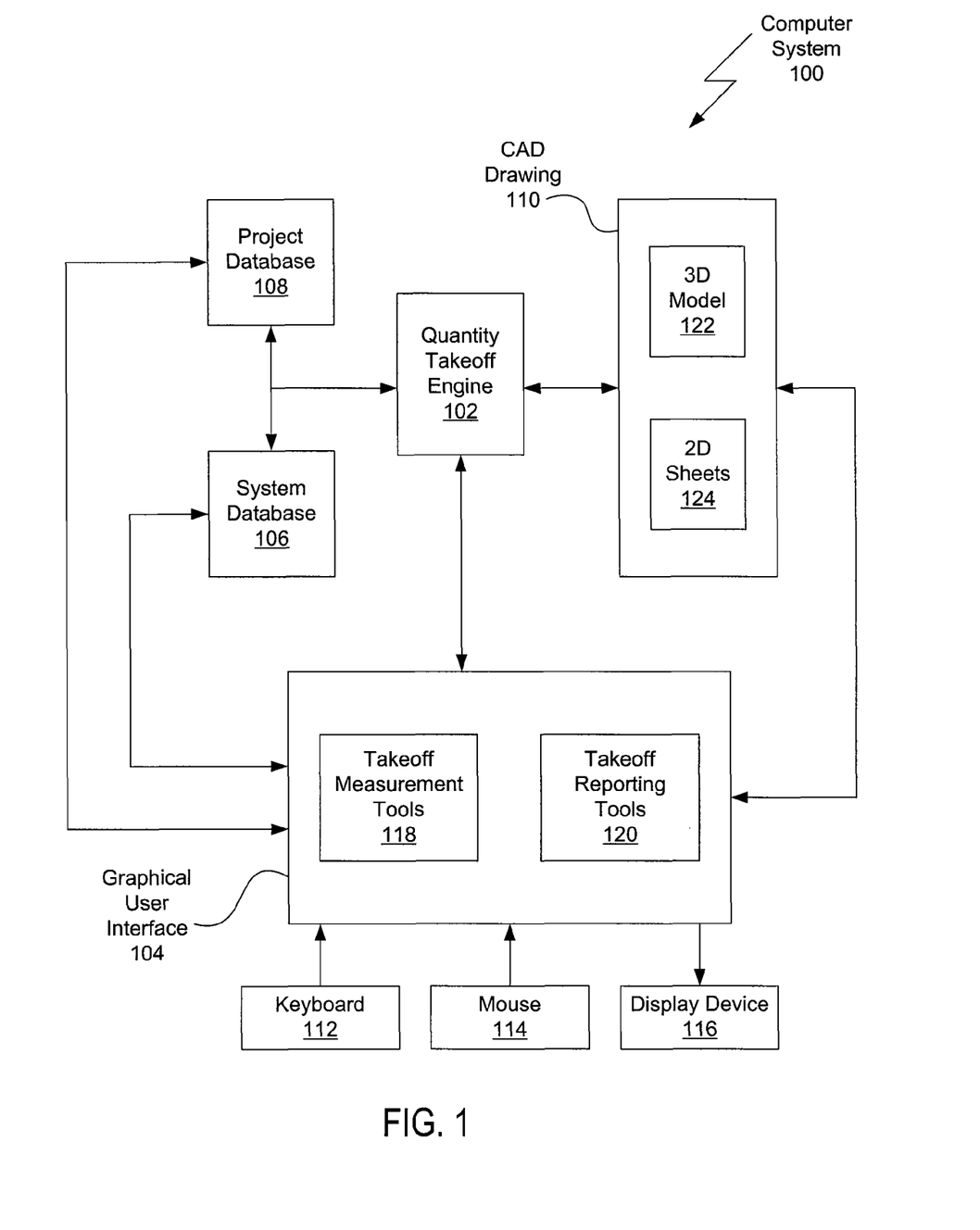
FIG. 1 is a conceptual illustration of a computer system configured to implement one or more aspects of the present invention.

FIG. 1 is a conceptual illustration of a computer system 100 configured to implement one or more aspects of the present invention. The computer system 100 can be any type of computing system, including a desktop computer, a server computer, a laptop computer, a tablet computer, and the like. Software applications described herein, however, are not limited to any particular computing system and may be adapted to take advantage of additional computing systems as they become available.

As shown, the computer system 100 includes a quantity takeoff engine 102, a graphical user interface 104, a system database 106, a project database 108, a CAD drawing 110, a keyboard 112, a mouse 114, and a display device 116. The components of computer system 100 may be software applications executing on distributed systems communicating over computer networks including local area networks or large, wide area networks, such as the Internet. For example, the graphical user interface 104 may include a software program executing on a client computer system communicating with the quantity takeoff engine 102 residing at another physical location.

Among other things, the computer system 100 is configured to store takeoff data, perform takeoff measurements, and generate takeoff reports. The quantity takeoff engine 102 may be configured to allow users, interacting with the graphical user interface 104 via the keyboard 112 and the mouse 114, to generate takeoff objects containing information used to perform quantity takeoff computations. Quantity takeoff objects may be used to calculate the unit cost of construction materials and to generate takeoff reports detailing the estimated costs of the project. Also as shown, the graphical user interface 104 provides takeoff measurement tools 118 and takeoff reporting tools 120. The takeoff measurement tools 118 may include takeoff object manipulation tools, search tools, and takeoff graphical command tools. The takeoff reporting tools 120 may be used to generate and display a takeoff report on the display device 116.

In one embodiment, the system database 106 may include information, such as drawing information and the unit cost of labor, shared among multiple design projects. The drawing information may be used for takeoff calculations.

The composition of a given design project may be reflected in a collection of one or more CAD drawings 110. As shown, CAD drawing 110 includes a three-dimensional (3D) model 122 and one or more two-dimensional (2D) sheets 124. The 3D model 122 may represent virtually any real-world construct, for example, a CAD model of a building. In such a case, the 3D model 122 may include detailed 3D geometry representing the building materials, each floor of the building, and different systems for the building (e.g., electrical systems, HVAC systems, etc.). The 2D sheets 124 may be derived from the 3D model 122 and may provide different views of the 3D model 122, such as plan, profile, and section views of different aspects of the project. In one embodiment, the quantity takeoff engine 102 may be configured to use information in the system database 106, the project database 108, and the CAD drawing 110 to perform quantity takeoff computations. The quantity takeoff engine 102 is also configured to store these computations in the system database 106 and/or the project database 108. Accordingly, the quantity take off engine 102 and the graphical user interface 104 may include programmed instructions allowing users to create, edit, load, and save elements from system database 106, the project database 108, and/or the CAD drawing 110. For example, the graphical user interface 104 may allow users to create, edit, load, and save takeoff objects and takeoff reports.

Figure 2:
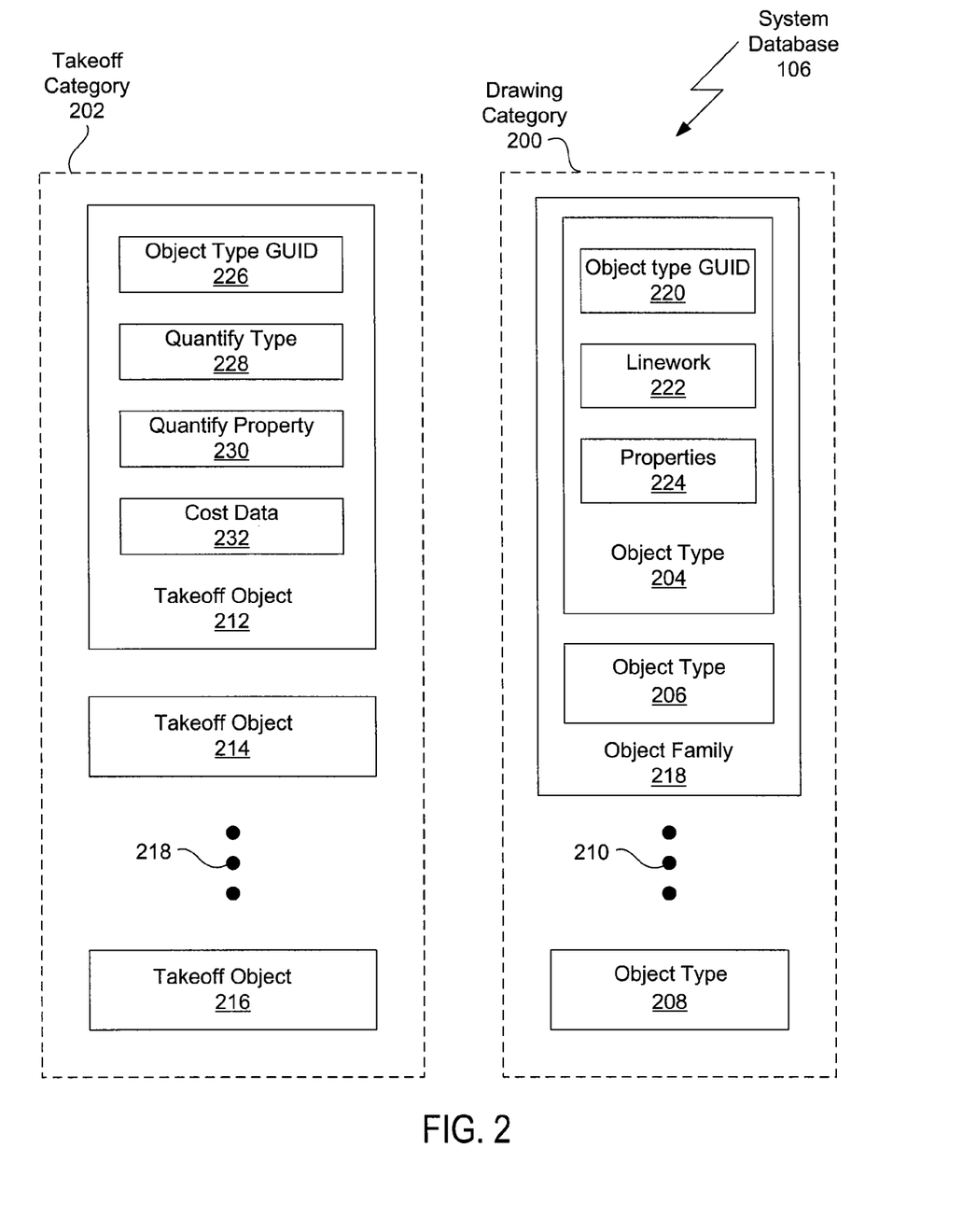
FIG. 2 is a conceptual illustration of elements of the system database of FIG. 1, according to one embodiment of the invention.

FIG. 2 is a conceptual illustration of elements in the system database 106 of FIG. 1, according to one embodiment of the invention. As shown, the system database 106 includes a drawing category 200 and a takeoff category 202, both of which are used to organize data within the system database 106. Those skilled in the art will recognize, however, that the components shown in FIG. 2 are simplified to highlight aspects of the present invention and that the system database 106 may include a wide variety of organizational structures and data.

The drawing category 200 includes object types 204, 206, and 208. Additional object types may be included in the drawing category 200, indicated by the ellipses 210. Each of the object types 204, 206, 208 may be created, edited, and used by various CAD tools, including the quantity takeoff engine 102 and the graphical user interface 104 of FIG. 1. Again, each of the object types 204, 206, 208 may define an abstract template from which specific instances of the object type may be present in a CAD drawing. For example, the object type 204 may define a first toilet object type, and the CAD drawing 110 of FIG. 1 may contain numerous instances of this toilet, each of which inherits some data from the first toilet object type 204. Similarly, object type 206 may define a second toilet object type and the CAD drawing 110 may contain instances of this different toilet. In one embodiment, related object types may be organized in an object family 218, as described in greater detail below in FIG. 3. For example, each of the object types 204, 206 related to toilets may be grouped in a toilet object family 218, and each of the object types created for different types of doors in the CAD drawing 110 may be grouped in a door object family. As persons skilled in the art will appreciate, this hierarchy may simplify changes made to the CAD drawing 110 and ensure consistency throughout the CAD drawing 110 over the life of a particular design project.

The object type 204 includes an object type globally unique identifier 220 (object type GUID 220), linework 222, and properties 224. The object type GUID 220 uniquely identifies the object type 204 within system database 106. That is, object type GUID 220 may be used to represent a common class of drawing objects in the CAD drawing 110. Furthermore, GUID values may be used by other constructs, such as takeoff objects and instances of object type 204. The linework 222 may define shapes, such as points, lines, and curves that may be displayed by the graphical user interface 104. For example, the linework 222 could provide the shapes required to display a toilet in 3D views or in 2D profile, plan, or section views generated from the CAD drawing 110. In one embodiment, the properties 224 may further define how CAD tools interact with the object type 204 and any instances of object type 204. In another embodiment, the properties 224 may define meta data about a given drawing object such as width, height, weight, material, and others. Each of the other object types 206, 208, may include a similar object type GUID, linework, and properties.

The takeoff category 202 includes takeoff objects 212, 214, 216. Additional takeoff objects may be included in the takeoff category 202, indicated by the ellipses 218. In one embodiment, the takeoff category 202 may correspond to a standard organizational system, such as CSI-16 or Uniformat. Each of the takeoff objects 212, 214, 216 may be associated with a corresponding object type, such as object types 204, 206, 208, respectively. Again, the takeoff objects 212, 214, 216 may be created, edited, and used by various CAD tools, including the quantity takeoff engine 102 and the graphical user interface 104. For example, takeoff object 212 may corresponding to the first toilet object type 204 and may be created, added to the takeoff category 202 for plumbing fixtures, and subsequently used for quantity takeoff operations.

The takeoff object 212 includes an object type GUID 226, a quantify type 228, a quantify property 230, and cost data 232. In one embodiment, each object type GUID 226 may be associated with a corresponding object type 204, 206, 208. The quantify type 228, the quantify property 230, and the cost data 232 may be used to estimate the cost of each of the instances associated with the takeoff object 212. In one embodiment, the quantify type 228 defines the type of enumeration, such as count, linear, or area, that is used to calculate the "quantity" of each instance when performing a quantity takeoff operation. The quantify property 230 may define an instance-specific property, such as a length or a volume, corresponding to the quantify type 228. The cost data 232 may include numerical constants, such as labor cost per unit, as well as takeoff calculation equations, used to estimate cost.

For example, the takeoff object 212 may be associated with the first toilet object type 204. The object type GUID 226 of the takeoff object 212 may be equal to the object type GUID 220 of the first toilet object type 204, thereby indicating that the quantify type 228, quantify property 230, and cost data 232 of the takeoff object 212 may be used when performing a quantity takeoff operation on instances of the object type 204 (i.e., instances of the first toilet). The quantify type 228 may be set to "count," indicating that the quantity to measure during takeoff is the number of instances of the first toilet object type 204. Furthermore, the cost per first toilet may be specified in the cost data 232. Each instance of the first toilet in the CAD drawing 110 is then counted and the aggregate total cost of all first toilets in the CAD drawing 110 may be added to the total cost of the project.

Figure 3:
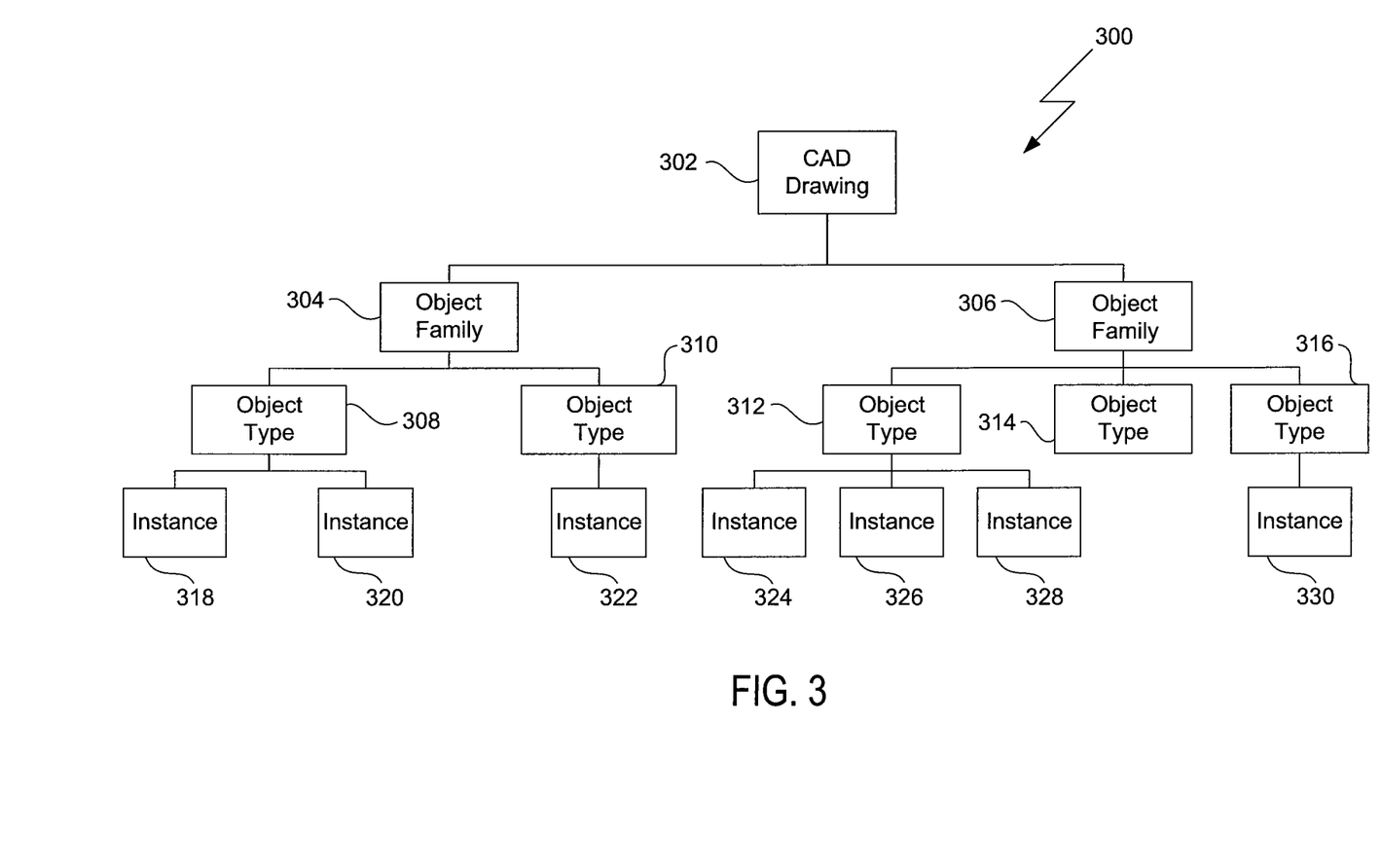
FIG. 3 is a conceptual illustration of a hierarchical representation of a CAD drawing, according to one embodiment of the invention.

FIG. 3 is a conceptual illustration of a hierarchical representation 300 of a CAD drawing 302, according to one embodiment of the invention. As shown, the hierarchical representation 300 includes object families 304, 306, object types 308, 310, 312, 314, 316, and instances 318, 320, 322, 324, 326, 328, 330. As described herein, the CAD drawing 302 may be organized according to object families 304, 306. An object family represents a group of related object types in the CAD drawing 302. Similarly, each object family may be organized according to object types. Again, object types may define an abstract template from which specific instances of the object type are present in the CAD drawing. As shown, object family 304 includes object types 308, 310 and object family 306 includes object types 312, 314, 316. Instances 318, 320 are instances of object type 308, instance 322 is an instance of object type 310, instances 324, 326, 328 are instances of object type 312, and instance 330 is an instance of object type 316. There are no instances of object type 314 present in the CAD drawing 302.

Suppose that CAD drawing 302 represents a building, and object families 304, 306 represent a door family and a wall family, respectively. The door family includes object types 308, 310 that may correspond to interior door and exterior door object types, respectively. Instances 318, 320 are instances of the interior door object type 308. Instance 322 is an instance of exterior door object type 310. Similarly, the wall family includes object types 312, 314, 316 that may correspond to a foundation wall, interior wall, and exterior wall object types, respectively. Instances 324, 326, 328 are each instances of the foundation wall object type 312. Instance 330 is an instance of the exterior wall object type. As described above, there are no instances of the interior wall object type 314 present in the CAD drawing 302.

In alternate embodiments, the hierarchical representation 300 may include additional levels of object families. For example, a top-level object family may include one or more lower levels of object families, where the object types are organized according to the lowest level of object families.

Figure 4:
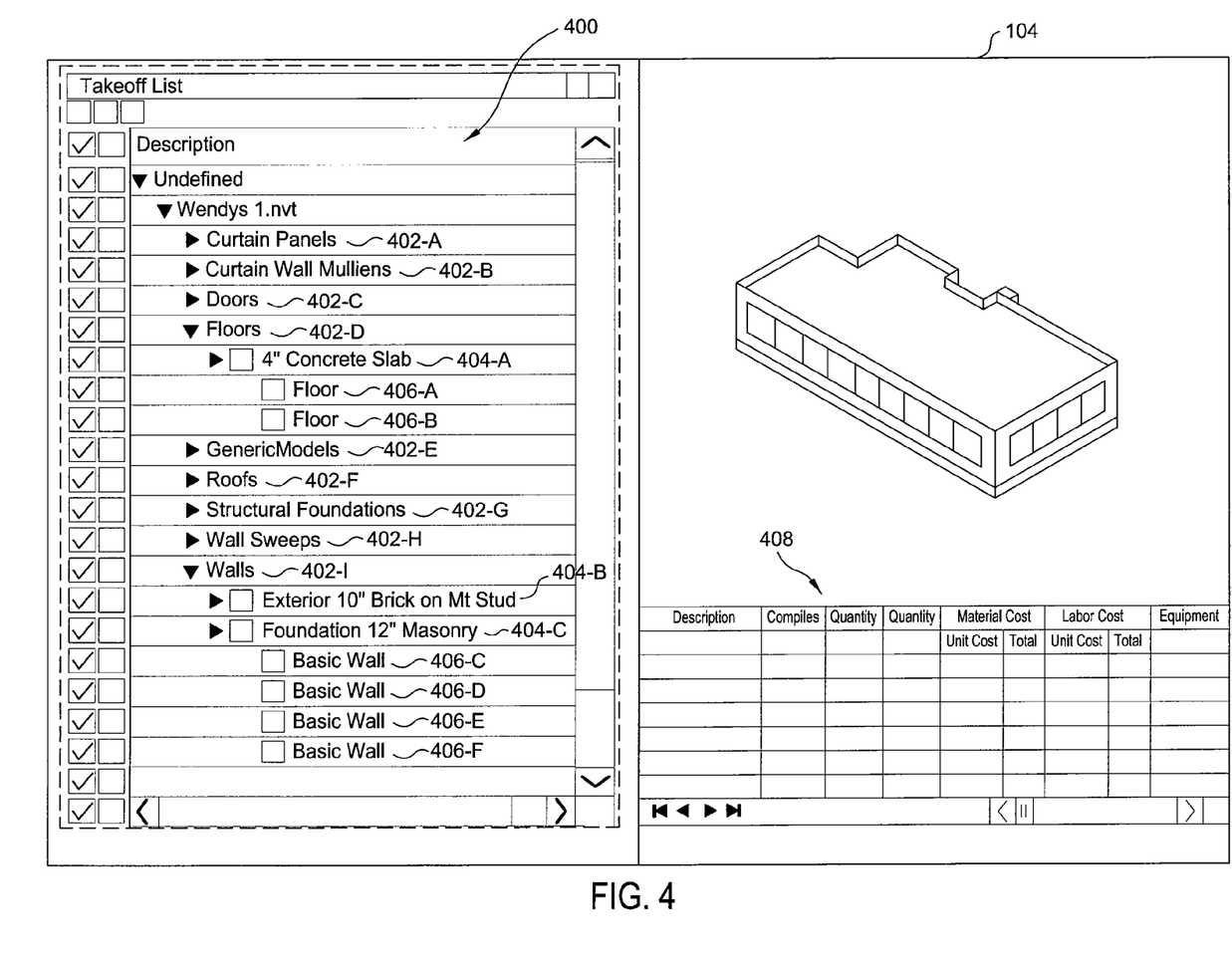
FIG. 4 is screen shot illustrating a graphical user interface for selective model takeoff, according to one embodiment of the invention.

FIG. 4 is screen shot illustrating a graphical user interface 104 for selective model takeoff, according to one embodiment of the invention. As shown, graphical user interface 104 includes hierarchical representation 400. The hierarchical representation 400 includes object families 402-A through 402-I, object types 404-A through 404-C, and instances 406-A through 406-F. The hierarchical representation 400 facilitates user interaction with the takeoff measurement tools 118, the takeoff reporting tools 120, and the quantity takeoff engine 102, as shown in FIG. 1. For example, a quantity takeoff computation may be performed on a specific instance of an object type, on all instances of an object type, on an object family, or on the entire CAD drawing, as described herein. The results of the quantity takeoff computation may be organized in a takeoff report that is displayed in a report view pane 408.

Figure 5:
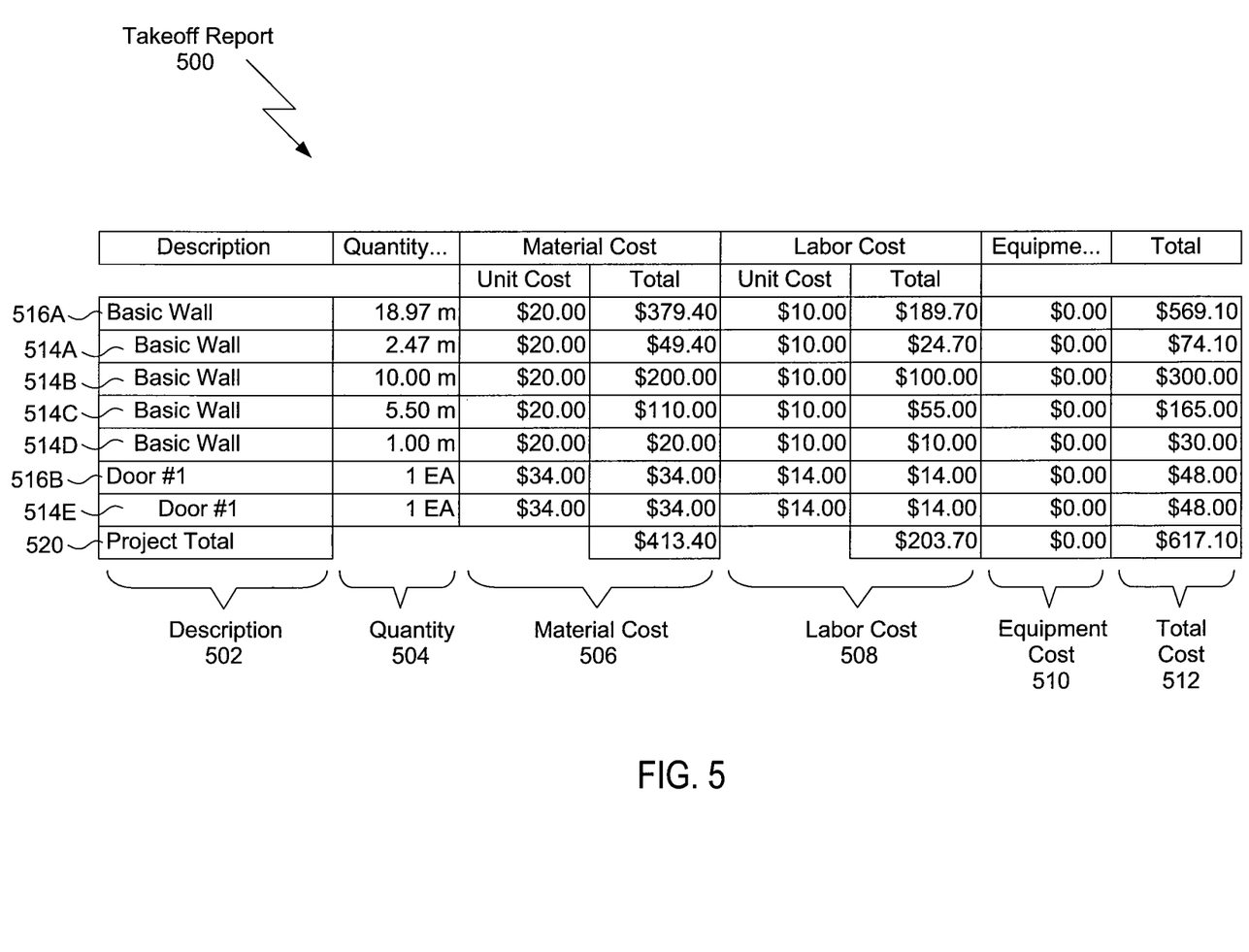
FIG. 5 illustrates a takeoff report, according to one embodiment of the invention.

FIG. 5 illustrates a takeoff report 500, according to one embodiment of the invention. As shown, the takeoff report 500 is configured to include a description 502, a quantity 504, a material cost 506, a labor cost 508, an equipment cost 510, and a total cost 512. In one embodiment, the takeoff report 500 may be generated by the takeoff reporting tools 120 of FIG. 1. Also as shown, the description 502 includes a listing of objects types and associated instances. For each of instance 514A through 514E shown under the description 502, the quantity 504, the material cost 506, the labor cost 508, the equipment cost 510, and the total cost 512 are displayed. These values may be summed together for each object type 516A, 516B displayed in the takeoff report 500 to generate a total cost for the project, as indicated by project total 520.

Figure 6:
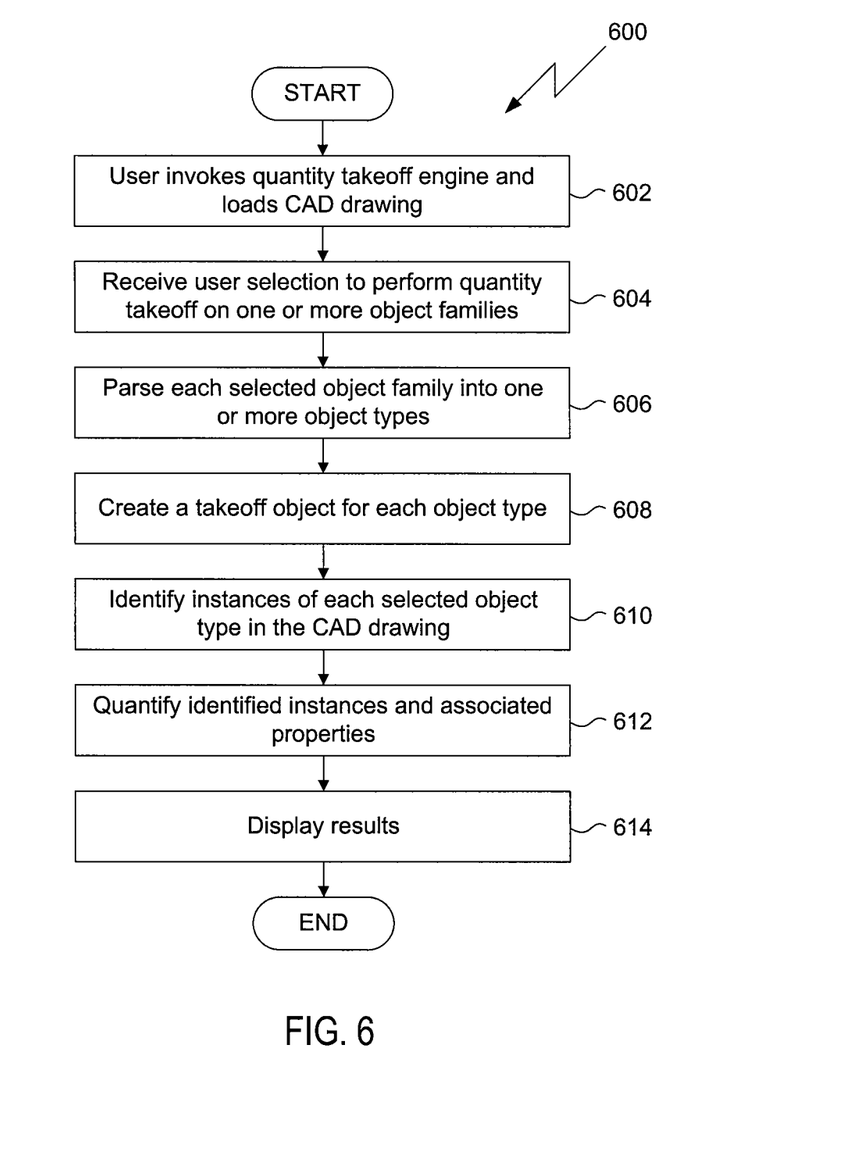
FIG. 6 is a flow diagram of method steps for performing a quantity takeoff computation across one or more object families, according to one embodiment of the invention.

FIG. 6 is a flow diagram of method steps for performing a quantity takeoff computation across one or more object families, according to one embodiment of the invention. Persons skilled in the art will understand that even though the method is described in conjunction with the systems of FIGS. 1-5, any system configured to perform the method steps, in any order, is within the scope of the present invention.

As shown, method 600 begins at step 602, where the user invokes a quantity takeoff engine and loads a CAD drawing into the quantity takeoff engine. Again, the different object families represent groups of related object types, and the different instances of the object types represent the drawing objects stored in the CAD drawing. In one embodiment, the CAD drawing may be organized in a hierarchical representation having one or more object families that include one or more object types. Each object type may have associated properties, including height, width, weight, and others.

At step 604, the quantity takeoff engine receives a single user selection to perform a quantity takeoff computation across one or more object families. In one embodiment, the user may select a single object family on which the quantity takeoff engine is to perform a quantity takeoff computation. In another embodiment, the user may select multiple object families, or even the entire CAD drawing (i.e., all designated object families) across which to perform the quantity takeoff computation.

At step 606, the quantity takeoff engine parses each selected object family into one or more object types. As described herein, each object family may include one or more object types. For example, the CAD drawing may represent a building and a "doors" object family may be selected for quantity takeoff. The doors object family may be a separate node in a hierarchical representation of the building CAD drawing. The quantity takeoff engine may parse the doors object family to determine that the object family includes separate object types corresponding to interior doors and exterior doors. Persons skilled in the art will recognize that, to the extent an object family includes one or more lower-level object families, the quantity takeoff engine parses each object family at each hierarchical level, down to the lowest hierarchical level, where the quantity takeoff engine parses the object families at that lowest level into one or more object types.

At step 608, the quantity takeoff engine creates a takeoff object for each object type of the selected object families. In one embodiment, each takeoff object may include a unique object type GUID 226, as described in FIG. 2. The object type GUID 226 for each takeoff object may be set to equal the object GUID 220 of each object type, thereby creating an association between the takeoff objects and the corresponding object type.

At step 610, the quantity takeoff engine identifies instances of each selected object type in the CAD drawing. In one embodiment, the quantity takeoff engine identifies each drawing object in the CAD drawing having an object type GUID 220 that matches the object type GUID 226 of the takeoff objects created at step 608.

In step 612, the quantity takeoff engine quantifies the identified object instances and the properties associated with those instances. As previously described herein, quantifying the object instances may include a numerical count of the instances or a summation of properties associated with instances of the same object type. For example, for an interior door object type, the quantity may be a count of the number of instances of the interior door object type in the CAD drawing. For an interior wall object type, the takeoff engine may quantify the properties associated with instances of the interior wall object type in CAD drawing to determine a combined linear length of all such walls. Other properties associated with the instances may include materials cost, labor cost, weight, height, and other properties.

In step 614, the quantity takeoff engine displays the results of the quantity takeoff computation. The results may be displayed in a takeoff report 500, as shown in FIG. 5.

One advantage of the systems and methods described above is that they provide a user with the ability to perform a quantity takeoff computation across multiple object types included in multiple object families simultaneously. Another advantage is that a user may perform a quantity takeoff computation across an entire CAD drawing by invoking a single command. Among other things, these advantages allow users to more quickly and easily estimate the cost of complex design and design projects.

While the forgoing is directed to embodiments of the present invention, other and further embodiments of the invention may be devised without departing from the basic scope thereof. For example, aspects of the present invention may be implemented in hardware or software or in a combination of hardware and software. In addition, in one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for performing a quantity takeoff computation, the method comprising:
    organizing a CAD drawing into a hierarchical representation that includes at least one object family associated with a plurality of object types, wherein each object family corresponds to a different object, each of the plurality of object types corresponds to a different variation of the different object, and each instance of each object type associated with an object family represents a drawing object present in the CAD drawing;
    receiving a selection of a first object family;
    parsing the first object family to determine the plurality of object types associated with the first object family;
    creating a takeoff object for each of the plurality of object types associated with the first object family;
    identifying, via a processor, instances of each of the plurality of object types associated with the first object family, wherein each instance is associated with one or more object properties and is identified by a different instance globally unique identifier (GUID); and
    quantifying the instances and the one or more object properties associated with each instance to produce a quantity takeoff value.

2. The method of claim 1, wherein receiving the selection of the first object family comprises receiving a selection of every object family in the CAD drawing, and the steps of parsing, creating a takeoff object, identifying instances, and quantifying are performed for each object family in the CAD drawing.

3. The method of claim 1, wherein each takeoff object is identified by a different takeoff GUID.

4. The method of claim 3, wherein identifying instances of each of the plurality of object types associated with the selected object family comprises comparing the instance GUID of each instance with the takeoff GUID of each takeoff object.

5. The method of claim 4, wherein quantifying the instances comprises calculating a numerical count.

6. The method of claim 1, wherein quantifying the one or more object properties associated with each instance comprises calculating a linear count, an area computation, or a volumetric computation that specifies how the one or more object properties associated with each instance are to be quantified.

7. The method of claim 1, further comprising the step of displaying the result by:
    generating a takeoff report using the takeoff objects, wherein the takeoff report includes the values for a quantify type, a quantify property, a cost data, and a cost estimate; and
    displaying the takeoff report.

8. A non-transitory computer-readable storage medium storing instructions that when executed by a processor cause the processor to perform a quantity takeoff computation, by performing the steps of:
    organizing a CAD drawing into a hierarchical representation that includes at least one object family associated with a plurality of object types, wherein each object family corresponds to a different object, each of the plurality of object types corresponds to a different variation of the different object, and each instance of each object type associated with an object family represents a drawing object present in the CAD drawing;
    receiving a selection of a first object family;
    parsing the first object family to determine the plurality of object types associated with the first object family;
    creating a takeoff object for each of the plurality of object types associated with the first object family;
    identifying instances of each of the plurality of object types associated with the first object family, wherein each instance is associated with one or more object properties and is identified by a different instance globally unique identifier (GUID); and quantifying the instances and the one or more object properties associated with each instance to produce a quantity takeoff value.

9. The non-transitory computer-readable storage medium of claim 8, wherein receiving the selection of the first object family comprises receiving a selection of every object family in the CAD drawing, and the steps of parsing, creating a takeoff object, identifying instances, and quantifying are performed for each object family in the CAD drawing.

10. The non-transitory computer-readable storage medium of claim 8, wherein each takeoff object is identified by a different takeoff GUID.

11. The non-transitory computer-readable storage medium of claim 10, wherein identifying instances of each of the plurality of object types associated with the selected object family comprises comparing the instance GUID of each instance with the takeoff GUID of each takeoff object.

12. The non-transitory computer-readable storage medium of claim 11, wherein quantifying the instances comprises calculating a numerical count.

13. The non-transitory computer-readable storage medium of claim 8, wherein quantifying the one or more object properties associated with each instance comprises calculating a linear count, an area computation, or a volumetric computation that specifies how the one or more object properties associated with each instance are to be quantified.

14. The non-transitory computer-readable storage medium of claim 8, further comprising the step of displaying the result by:
    generating a takeoff report using the takeoff objects, wherein the takeoff report includes the values for a quantify type, a quantify property, a cost data, and a cost estimate; and
    displaying the takeoff report.

15. A computing system configured to perform a quantity takeoff computation, the system comprising a processor configured to:
    organize a CAD drawing into a hierarchical representation that includes at least one object family associated with a plurality of object types, wherein each object family corresponds to a different object, each of the plurality of object types corresponds to a different variation of the different object, and each instance of each object type associated with an object family represents a drawing object present in the CAD drawing;
    receive a selection of a first object family;
    parse the first object family to determine the plurality of object types associated with the first object family;
    create a takeoff object for each of the plurality of object types associated with the first object family;
    identify instances of each of the plurality of object types associated with the first object family, wherein each instance is associated with one or more object properties and is identified by a different instance globally unique identifier (GUID); and
    quantify the instances and the one or more object properties associated with each instance to produce a quantity takeoff value.

16. The computing system of claim 15, wherein each takeoff object is identified by a different takeoff GUID.

17. The computing system of claim 16, wherein identifying instances of each of the plurality of object types associated with the selected object family comprises comparing the instance GUID of each instance with the takeoff GUID of each takeoff object.

18. The method of claim 1, wherein the first object family is selected from the group consisting of a door family, a wall family, and a toilet family, and the plurality of object types is selected from the group consisting of different types of doors, different types of walls, and different types of toilets.

* * * * *